US012340426B2

(12) United States Patent
DiNunzio et al.

(10) Patent No.: US 12,340,426 B2
(45) Date of Patent: Jun. 24, 2025

(54) SYSTEM AND METHODS FOR BUILDING A DIGITAL ASSET BASED SOCIAL MEDIA APPLICATION AND REWARD PLATFORM

(71) Applicant: QVI Group LLC, Portsmouth, NH (US)

(72) Inventors: Alexander DiNunzio, Boston, MA (US); Jason Ciruolo, Boston, MA (US); Brian Weaver, Boston, MA (US); Brandon Groeger, Boston, MA (US)

( * ) Notice: Subject to any disclaimer, the term of this patent is extended or adjusted under 35 U.S.C. 154(b) by 419 days.

(21) Appl. No.: 17/900,756

(22) Filed: Aug. 31, 2022

(65) Prior Publication Data

US 2023/0019573 A1 Jan. 19, 2023

Related U.S. Application Data

(63) Continuation-in-part of application No. 16/879,685, filed on May 20, 2020, now Pat. No. 11,455,694.

(51) Int. Cl.
*G06Q 50/00* (2024.01)
*G06Q 20/38* (2012.01)
*G06Q 30/0207* (2023.01)

(52) U.S. Cl.
CPC ......... *G06Q 50/01* (2013.01); *G06Q 20/3827* (2013.01); *G06Q 20/389* (2013.01); *G06Q 30/0207* (2013.01); *G06Q 2220/00* (2013.01)

(58) Field of Classification Search
CPC .. G06Q 50/01; G06Q 20/3827; G06Q 20/389; G06Q 30/0207; G06Q 2220/00
See application file for complete search history.

(56) References Cited

U.S. PATENT DOCUMENTS

2016/0292672 A1 10/2016 Fay et al.
2017/0011460 A1 1/2017 Molinari et al.
(Continued)

FOREIGN PATENT DOCUMENTS

TW          I674543       10/2019
WO       2016202952       12/2016

*Primary Examiner* — Scott C Anderson
(74) *Attorney, Agent, or Firm* — Lambert Shortell & Connaughton; David J. Connaughton, Jr.; Justin P. Tinger

(57) ABSTRACT

The present disclosure relates to blockchain and social media, and more specifically, to a unified engagement platform that incentivizes blockchain use and provides avenues for companies to foster brand loyalty amongst consumers. In accordance with aspects and embodiments, a method of facilitating blockchain use is provided. The method comprises providing a social media platform in communication with a blockchain and providing each user of the platform with a blockchain account. Social media influencers and creators, brands, and retailer users of the platform, referred to as partners, are provisioned with a set of digital collectibles having value and are provided with tools to create additional digital collectibles. A partner's digital collectibles are distributed to non-partner users on the platform that support the partner, users referred to as supporters. Supporters may obtain digital collectibles by purchasing them, by engaging in social media activity that benefits the partner, offering the digital collectible, or digital collectibles may be offered by partners as contest and sweepstakes prizes. The platform uses the blockchain for the construction, management, and distribution of all digital collectibles, and each time a digital collectible is created or distributed, a transaction must be posted to the blockchain to complete the distribution.

18 Claims, 6 Drawing Sheets

(56) References Cited

U.S. PATENT DOCUMENTS

| | | |
|---|---|---|
| 2017/0140408 A1 | 5/2017 | Wuehler |
| 2017/0155515 A1 | 6/2017 | Androulaki et al. |
| 2017/0221029 A1 | 8/2017 | Lund et al. |
| 2017/0357966 A1 | 12/2017 | Chandrasekhar et al. |
| 2017/0358041 A1* | 12/2017 | Forbes, Jr. ............... G05D 3/12 |
| 2019/0066065 A1 | 2/2019 | Wright et al. |
| 2019/0073666 A1 | 3/2019 | Ortiz et al. |
| 2019/0132284 A1* | 5/2019 | Gould ................ G06Q 30/0207 |
| 2019/0311341 A1 | 10/2019 | Rice |
| 2019/0347668 A1* | 11/2019 | Williams ................ G06F 18/23 |
| 2020/0005284 A1* | 1/2020 | Vijayan ................ G06Q 20/065 |
| 2020/0134660 A1* | 4/2020 | Kadaster ............... H04L 9/0637 |
| 2020/0151823 A1* | 5/2020 | Shi ......................... G06Q 30/06 |
| 2020/0302470 A1* | 9/2020 | Walsh ................ G06Q 30/0238 |

\* cited by examiner

SYSTEM AND METHODS FOR BUILDING A DIGITAL ASSET BASED SOCIAL MEDIA APPLICATION AND REWARD PLATFORM

FIELD OF DISCLOSURE

The present disclosure relates to social media and information sharing platforms and more specifically, to a novel platform powered by blockchain digital collectibles. The blockchain-powered digital collectible platform that is the subject of the present disclosure advantageously allows partners on the platform to reward users with digital collectibles for engaging with their accounts, thereby incentivizing user engagement and facilitating partner account growth.

BACKGROUND

Technology, and more specifically, social media platforms, i.e., and interactive computer-mediated technologies that facilitate the creation or sharing of information, ideas, and other forms of expression, permeate every aspect of modern life, from consumerism to individuals' most personal activities. For these reasons, social media drives a large portion of business marketing and requires companies, regardless of their size, to stay current with new and popular platforms to maintain engagement with their audiences. As individuals spend more and more of their time on these platforms, businesses must leverage their presence on these platforms to capture market share and inspire brand loyalty.

The social media presence of a business and the image they present on a social media platform can have a direct impact on the success of the company. For example, several fast food chains have gained notoriety for their banter on Twitter, which has in turn resulted in them garnering a larger following and fan base. A well-known soup company has used its Facebook page to condemn certain hate speech, which resulted in positive publicity and inspired brand loyalty among many consumers.

Businesses may also use their social media pages to engage their followers by running contests and promotions on their various platforms. However, this generally requires a business to select one platform on which to run the promotion and therefore limits the audience reach only to the business's followers on that unique social media platform. Moreover, social media platforms are not structured for such types of promotions and contests, and businesses must devise on their own how they are going to engage their followers. There thus exists a need for a new social media platform for businesses to use that provides an avenue for businesses to reach their followers across all their social media platforms. There further exists a need for a platform structured for business use and designed for the purposes of incentivizing users to engage with businesses for the purpose of growing brand loyalty.

A growing aspect of social media platforms and/or digital environments like virtual worlds and video games are digital items acquired and/or purchased within the platform, much like physical goods are purchased in the physical world. Users aim to grow their collections of these items for various reasons. For example, users may seek to collect weapons in a virtual world video game to show off their playing prowess. Alternatively, a user on a social media platform may purchase a filter from a social media influencer to impress their friends. There exists a need for a social media platform where businesses can generate these types of digital goods to capitalize on this phenomenon, thereby generating additional revenue streams. Further, to date, when such digital goods are purchased in a given digital environment, social media platform, or application, the goods are not transferable between platforms. There exists a need to make digital goods interoperable between social media platforms and other digital environments to enhance their value.

Online transactions however can generate security concerns and skepticism amongst users. To solve the problem of security issues with online transactions, many technology savvy individuals elect to use blockchain to make online purchases. Blockchain is a transaction record-keeping system and forms the bedrock for cryptocurrencies.

While blockchain technology is complex, it can be broken down into easily understood principles. Blockchain is a chain of "blocks" made up of pieces of digital information that relate to transactions that have taken place. Blocks on a blockchain store three important pieces of information about each transaction that occurs. The first piece of information stored is information about the transactions like the date, time, and amount of the transaction. The second piece of information stored in the block is information about who is participating in the transaction. The individuals participating in a transaction are represented by a unique digital signature, thus making the information stored on the block about the transaction anonymous. The third piece of information stored in the block is an identifier that distinguishes the block from all other blocks. These identifiers are called "hashes" and are generated by special algorithms.

What makes blockchain systems unique is that each and every transaction must be verified. However, unlike traditional accounting systems where there's an individual in charge of vetting new data entries, with blockchain, that job is left up to a network of computers. Once a transaction occurs, it must be verified as accurate, and is then stored in a block and given a hash. The block is given the hash of the most recent block added to the blockchain, and once hashed, the block can be added to the blockchain. Each and every transaction on a blockchain network is approved by a network of third party validating computers. This removes almost all human involvement in the verification process and results in a more accurate record of information. Moreover, when the new block is added to the blockchain, it becomes publicly available for anyone on the blockchain network to view. This means that there are identical copies of the blockchain distributed across a network of computers, which makes the information nearly impossible to manipulate. This is why blockchain transactions are considered so secure.

Utilizing a blockchain network however requires significant technological know-how. This presents a significant barrier to less technologically advanced individuals from trading in cryptocurrency and using it as secure means of carrying out transactions. There is therefore a need for a platform by which individuals can use blockchain and benefit from the advantages it offers without having to first acquire knowledge of its technical workings. The present disclosure solves the problem of how technologically unsophisticated individuals can become blockchain users. The present disclosure advantageously integrates blockchain seamlessly with a social media platform designed for businesses to generate brand loyalty in users and generate new streams of revenue by selling digital goods.

SUMMARY OF DISCLOSURE

The present disclosure provides a social media platform, referred to herein as a unified engagement platform, that removes the technical barriers to using blockchain. The unified engagement platform disclosed further provides novel ways for businesses to engage their supporters, grow brand loyalty, and generate new revenue streams.

In accordance with aspects and embodiments, a unified engagement reward system is provided comprising a computer having a memory and a processor, a computer-readable medium having programming stored therein that when executed by the processor, causes the computer to provide a unified engagement platform. The computer is able to receive requests from users to join the unified engagement platform and register users as one of a partner or a supporter. At least one digital collectible is created for each partner and each user of the unified engagement platform. In some embodiments, the unified engagement platform is in communication with a blockchain and the unified engagement platform provisions each user with a blockchain account. In some embodiments, the blockchain is the Algorand MainNet, and the computer is connected to the internet. Then at least one digital collectible is distributed to a supporter, and the distribution of the digital collectible to the supporter requires a transaction to be posted to the blockchain.

In some embodiments, distribution of at least one digital collectible is determined by a distribution programming, and the distribution programming comprises conditions that must be met by a supporter before distribution can take place.

In accordance with aspects and embodiments, at least one digital collectible uses the blockchain for its construction and management. Digital collectibles may be redeemable for physical goods or services and have value to supporters.

In accordance with aspects and embodiments, information about at least one digital collectible is stored in a memory of the computer.

In accordance with aspects and embodiments, each partner can create new digital collectibles for distribution, and creation and distribution of new digital collectibles requires a transaction to be posted to the blockchain.

Distribution can take place in a number of ways. Distribution can consist of purchase of the digital collectible by a supporter with currency, distribution can be an award to a supporter as a contest prize, or distribution can be a transfer of the digital collectible to a supporter in exchange for the supporter engaging in a predetermined set of activities.

In accordance with aspects and embodiments, a method of incentivizing use of blockchain is provided, the method comprising providing a social media platform in communication with a blockchain, providing each user of the social media platform with a blockchain account, provisioning a first group of users with a set of digital collectibles, the first group of users consisting of creators, brands, and retailers, and distributing the digital collectibles to a second group of users based on a distribution programming, wherein the second group of users consists of consumers and the distribution programming includes at least one condition that must be met by a supporter for distribution to occur.

The distribution of the digital collectibles requires a transaction to be posted to the blockchain for each digital asset distributed.

In some embodiments, the first group of users can create new digital collectibles and distribute the new digital assets to the second group of users based. The new digital collectibles created can be distributed in several ways. Distribution of the new digital collectibles may happen when a second user purchases a new digital collectible with currency, when a digital collectible is awarded as a contest prize, or when a transfer is made in exchange for a user engaging in a predetermined set of activities. The digital collectibles distributed to the second group of users are exchangeable between the second group of users.

In accordance with aspects and embodiments, the digital collectibles distributed have value, and some digital collectibles may be redeemable for goods and services offered by the first group of users.

DETAILED DESCRIPTION

Figure 1:
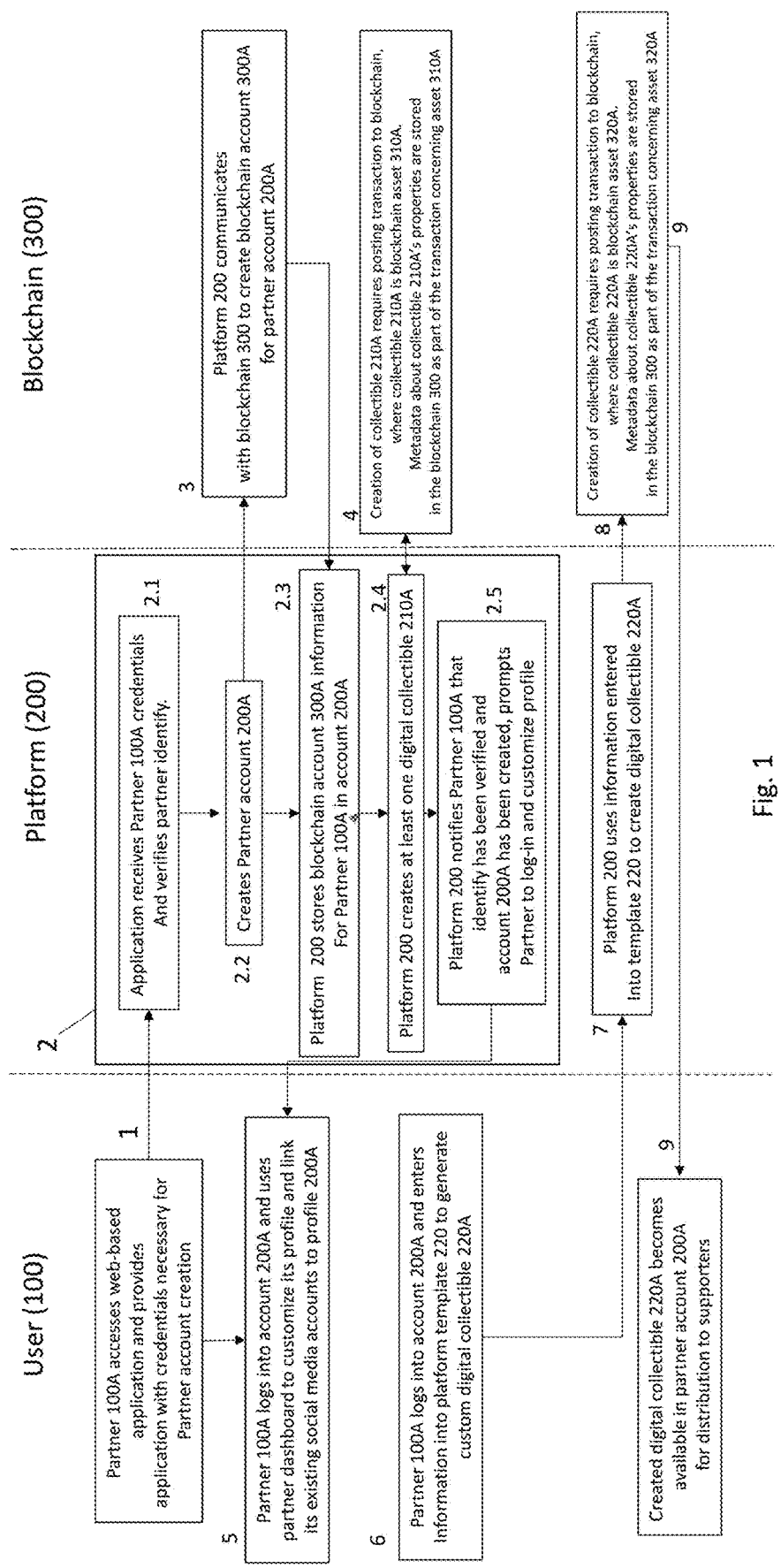
FIG. 1 shows a process tree of a unified engagement platform in accordance with aspects and embodiments.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In the description, specific details are set forth in order to provide a thorough understanding of the examples disclosed. In other instances, well-known methods, procedures, components and materials have not been described in detail as not to unnecessarily lengthen the present disclosure.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user input and/or output device such as a display screen device (e.g., a monitor) for display screening information to the computer user, and an optional user input device.

As will be appreciated by those skilled in the art, the present examples may be embodied, at least in part, by a computer program product embodied in any tangible medium of expression having computer-usable program code stored therein. For example, some embodiments described below can be implemented by computer program instructions. The computer program instructions may be stored in non-transitory computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The present disclosure contemplates various versions of the disclosed application including but not limited to a cloud-based application and a mobile phone application.

The present disclosure solves the problems associated with blockchain and engaging the base of a creator in order to grow the size and value of a digital community. Using the blockchain typically requires advanced technical knowledge which prevents new users from joining the blockchain. The present disclosure remedies this by removing this technology barrier to use by providing a social media platform, referred to herein as a unified engagement platform (sometimes simply referred to herein as "the platform" or "the application") that makes use of the blockchain on behalf of its users.

The present disclosure is directed to a social media platform, referred to herein as a unified engagement platform, configured to reach a given partner's (where a partner is a creator, brand, or retailer) followers across a variety of social media applications. As used herein, social media refers to interactive computer-mediated technologies that facilitate the creation or sharing of information, ideas, career interests and other forms of expression via virtual communities and networks. The unified engagement platform disclosed is designed to enable partners to incentivize and reward their supporters to build brand loyalty, grow their businesses, and generate new streams of revenue. The disclosed platform achieves these goals by providing partners with tools for creating blockchain digital collectibles and online marketplaces in which to sell them. The platform, via its partners, attracts users, by allowing partners to reach followers across all their social media networks and incentivizing their followers to engage with them on the unified engagement network by rewarding them with digital collectibles. Digital collectibles are created through digital collectible templates provided within the platform and may be distributed to users using distribution templates provided within the platform.

The value of digital collectibles is tied to their rarity, and scarcity, and it is therefore important that digital collectibles not be reproduced by unauthorized third parties. Use of blockchain for the creation and record keeping of digital collectibles solves the computer problem of unauthorized replication of digital collectibles by recording all aspects of the digital collectible on a publicly distributed ledger, thereby ensuring the integrity and value of digital collectibles. Accordingly, the use of blockchain for the "record keeping" of digital collectibles created within the platform ensures that each digital collectible on the platform is authentic and not an unauthorized duplicate.

Users of the presently disclosed platform will typically fall into one of two categories; they will be either a partner or a supporter, though it is possible that some users will hold both partner and supporter accounts and, in some embodiments, accounts may offer both partner and supporter features.

Partners include creators, brands, and retailers. Creators are any breed of influencer, digital content creator, or personality with an online presence. These users tend to build their businesses around ad revenue, sponsorships, financial contributions, and affiliate programs. Creators rely heavily on social media to market themselves and for revenue and their success depends on reaching the broadest audience possible and engaging the maximum number of people. The more individuals that identify with a creator, the more successful the creator is likely to be. Creators are limited by the constraints of social media applications. Creators do not yet have a way of engaging all their followers across all the social media applications through a single portal that provides them with additional revenue-generating tools. The present platform solves this problem by allowing creators to link all of their social media accounts to the present platform and provides incentives to follow or engage with creators on the unified engagement platform, bringing those followers onto the platform and positioning those followers to generate new streams of revenue for the creator.

Brands are defined as any company that provides a product or service. Brands typically deal in consumer products or services such as electronics, clothing, food, and streaming entertainment platforms. Some creators may have brands of their own as some have created products associated with their likenesses to build streams of revenue. Brands rely on existing customer loyalty and advertising to gain new customers. Brands rely on social media to increase awareness about their products and foster their public image. The ability to reach followers across all social media platforms maximizes a brand's reach. Loyalty is also crucial to long term brand success. Brands however do not often have ways beyond their advertisement campaigns and the sale of the products to foster such loyalty. The present platform provides a unique and novel way for brands to generate and reward consumer loyalty. Brands may use the disclosed platform to provide a new type of reward to their customer base, a digital collectible. The offering of digital collectibles by brands may engage consumers and strengthen a brand's overall presence. The use of the disclosed platform and its digital collectibles offers brands a novel and unique way to promote and differentiate themselves from competitors.

In some embodiments, digital collectibles may be utility or governance tokens. Utility and governance tokens may be constructed on a blockchain network, but, as is characteristic of the digital collectibles disclosed herein, these tokens are not currency. Rather, utility tokens may be collectibles that allow users to perform some actions on a certain network or ecosystem. For example, a utility token may allow a user to tip a content creator or donate to a brand through a blockchain network. Utility tokens and governance tokens may be associated with the creation of new unified engagement platforms or ecosystem projects, and governance tokens, unlike utility tokens, may provide users with control of the direction of these new projects through, for example, voting power. As will be appreciated by those skilled in the art, the distribution of utility and governance tokens to supporters further offers brands and/or content creators new and unique ways to promote themselves and their projects.

Retailers are any company that sells products or services on behalf of a brand. Retailers may struggle the most to inspire their own brand loyalty as consumers' buying habits are typically driven by brand-specific characteristics. Retailers now, more than ever, rely on carefully curating their image via social media and other advertising. For example, retailers like Anthropology and Hot Topic call to mind two very different customers, just as Costco and Whole Foods target different buyers/buying habits. To continue furthering their image and attracting and keeping customers, retailers can use the disclosed platform to better target their followers and retain their future business with rewards, such as discounts, free products, or loyalty points through the offering of digital collectibles.

For brevity, "partners" will be used to refer to the accounts that fit within any one of a creator, brand, or retailer account. In accordance with aspects and embodiments, FIG. 1 provides a process tree of actions taken and performed by users 100, the platform 200, and the blockchain 300. In step 1, a partner 100A, where partners are a subset of users 100A and supporters are a subset of users 100B, will register for an account. Registering may include the steps of accessing a web-based or mobile application and providing the application with an email address and selecting a corresponding password. In some embodiments, further authentication credentials may be required for the creation of a partner account. Platform 200 then performs a series of registration and account creation actions, collectively grouped in block 2. Platform 200 first uses the information provided by partner 100A in step 2.1 to verify partner 100A's identity by a multi-point due diligence process. After partner 100A's identity has been confirmed, platform 200 moves on to step 2.2 and generates partner account 200A for partner 100A. Platform 200 then communicates with blockchain 300 in step 3 to create blockchain account 300A associated with partner account 200A. In some embodiments, more than one blockchain account 300A is created for partner account 200A. In step 2.3, platform 200 stores the information associated with blockchain account 300A, including any cryptographic keys associated with account 300A, on platform 200 and platform 200 associates this stored information uniquely with partner account 200A.

In accordance with aspects and embodiments and as will be discussed further herein, the created blockchain accounts associated with user accounts, both partner accounts and support accounts, are used to power the creation and distribution of digital collectibles. This process happens in the background of the application, a concept represented by the dashed lines dividing environments in FIG. 1. In this way, a partner 100A is not required to engage directly with the blockchain 300. In some embodiments, the partner may view the application's blockchain engagement. In other embodiments, blockchain activity may not be shown unless a report of the activity is requested by the partner. In accordance with embodiments, certain information, i.e., the public information associated with blockchain account 300A is provided to partner 100A so that partner 100A can engage with the blockchain without needing knowledge of the technical aspects of blockchain transactions. For example, by providing a partner 100A with the public information associated with blockchain account 300A, including the public address of the account, partner 100A can use blockchain account 300A to receive blockchain currency or blockchain digital assets outside of the engagement platform. Partner 100A can thus use blockchain to receive blockchain currency and digital assets outside of the platform by providing the public address of their platform-created blockchain account to other blockchain users. Partner 100A simply uses the platform to facilitate blockchain use, both within the platform and external to the platform.

In some embodiments and still referring to FIG. 1, upon completion of registration, partners will be notified when their identity has been verified and they will be prompted to log in to the platform's unified engagement application to customize their account. For example, once platform 200 has provisioned account 200A with blockchain account 300A and digital collectible 210A, platform 200 takes step 2.5, completing the tasks in block 2, and notifies partner 100A that their identity has been verified and its account has been created. Partner 100A is prompted to log into their account. In some embodiments, Partner 100A may access and manage their account via a web-based application, a mobile application, or both.

In some embodiments, communication with and use of blockchain may be omitted. In these embodiments, the platform may use an internal record keeping system for the management of digital collectibles. In these embodiments, the platform may use fiat or platform specific currency for transactions. The internal record keeping system may include a digital collectible authenticator that verifies the authenticity of a digital collectible prior to allowing distribution (purchase or transfer) of the digital collectible. The internal record keeping system may further include anti-replication safeguards to ensure that authentic digital collectibles cannot be replicated and reproduced by unauthorized third parties.

In accordance with aspects and embodiments, Partners are provided with a partner user interface, referred to herein as a partner dashboard. The partner dashboard allows partners to manage their profile and create, customize, and distribute digital collectibles, link their social media accounts, view detailed analytics pertaining to their individual users, generate campaigns to boost engagement, growth, or monetary value for their business and engage their supporters. In some embodiments and referring to FIG. 1, in step 5 and on first login, partner 100A will be instructed and guided through creating a public profile. After the partner publishes its public profile, it will be provided with a "community feed" that its supporters can subscribe to by visiting the public profile and opting to follow the partner within the application. This feed may consist of supporters' posts, partner posts, and other content relevant to the partner's community. The partner can add notifications to the feed via controls within the web application.

Partners are given the option of linking their existing social media accounts to their profile on the platform, an option that may be provided as part of the creation of partner 100A's profile in step 5. The platform advantageously uses linked social media accounts to curate a list of partner 100A's followers from the linked social media accounts which in turn allows partners to use the curated follower list to perform outreach actions (not shown). Typically, only certain applications support one another. The present application may advantageously allow for follower curation across all social media accounts.

Each partner profile will be provisioned with a series of default blockchain digital collectibles that will be awarded automatically to non-partner users, i.e., supporters, based on distribution programming. Returning to FIG. 1, platform 200, as part of the registration and account creation process 2, creates digital collectible 210A for partner account 200A. Creation of digital collectible 210A requires a transaction be posted to blockchain 300. As shown in FIG. 1, this occurs at step 4. Digital collectible 210A is posted to the blockchain as a blockchain asset 310A. Digital collectible 210A may have monetary value but is not a piece of or quantity of currency. Metadata concerning collectible 210A's properties, i.e., scarcity and rarity, terms discussed further herein, are stored both within platform 200 and as part of the blockchain transaction concerning asset 310A.

Digital collectible 210A and other provisioned digital collectibles are distributed to supporters based on specific distribution programming. Distribution programming includes, but is not limited to, time-based and other predetermined actions performed by supporters. For example, a partner's first 100 supporters may get a "first" badge digital collectible. The badges are limited in supply and only distributed to each partner's first 100 supporters to entice early support of the partner on the platform. Additional, less prestigious, supporter badges may be awarded to subsequent supporters. To further encourage support, each digital collectible badge distributed may have attached to it a coupon or other physically redeemable item. For example, a pizza company just having joined the platform may incentivize its first 1000 followers by offering each a "first" badge. The first 100 may get a 50% of their next pizza order, the next 400 may get a 30% off coupon, and the next 500 may get a 20% off coupon. In this regard, the pizza company gains supporters and, hopefully, 1000 pizza orders.

A partner can incentivize their global list of followers to join the unified engagement platform via the advertising of digital collectibles through the partner dashboard. Use of the partner dashboard allows partners to advertise the availability of their digital collectibles on the platform while reaching their followers on each of their social media networks outside of the platform itself. Digital collectibles are only obtainable, however, though the unified engagement platform. To obtain a digital collectible, a follower must register for an account on the platform, thus becoming a supporter user. Though a user of the platform can register and create an account on the platform without "supporting" any brands, users other than partners are referred to as supporters herein to differentiate them from partners and to differentiate them from a partner's followers on social media networks. Users who register with the unified engagement platform as supporters are provided with a supporter user interface different from that of the partner dashboard.

In some embodiments, partners may have the ability to design and distribute their own custom digital collectibles. The creation of custom digital collectibles is facilitated through platform templates. Partners may, for example, choose and customize existing templates of specific digital collectibles. A customizable digital collectible template may, for example, be an iOS sticker. Other digital collectible templates may allow partners to generate custom digital collectibles associated with secure, password protected links that are only accessible via acquisition of the digital collectible. Additional digital collectibles and their associated templates will be readily ascertained by those of skill. Each digital collectible template will adhere to a set of distribution rules within the collection of which it is a part. These distribution rules include, but are not limited to, pricing, distribution logic, and other metadata for the organization and publication of collectibles to ensure that an identical 100 collectibles of a collection all adhere to the same distribution rules. Collections and the collectibles within them can be published and made available on the application's marketplace. In some embodiments, this may only be performed from a web-based application. In alternative embodiments, some or all collections may be published from mobile devices.

In accordance with aspects and embodiments and referring to FIG. 1, partner 100A may use platform template 220 to create a custom digital collectible. Partner 100A may use the partner dashboard to access template 220 and enter information into the template for the creation of digital collectible 220A, as shown in step 6. If the template is for a sticker, the template may require partner 100A to provide an image that will be the displayed sticker. The partner may further be required to enter information concerning the number of collectibles 220A to be generated from the set of information entered into 220 and other information that may impact the value of the collectible. As shown in step 7, the information entered into template 220 is then used by platform 200 to create digital collectible 220A, the creation of which also creates corresponding blockchain asset 320A that is posted to the blockchain in step 8. Blockchain asset 320A contains all the metadata concerning digital collectible 220A and its posting to the blockchain ensures the creation data of digital collectible 220A lives on eternally. Once the transaction is verified and thus completed by blockchain 300, the digital collectible 220A becomes available to partner 100A in step 9 in partner account 200A. Partner 100A can then distribute digital collectible 220A to engage its supporters.

Figure 2:
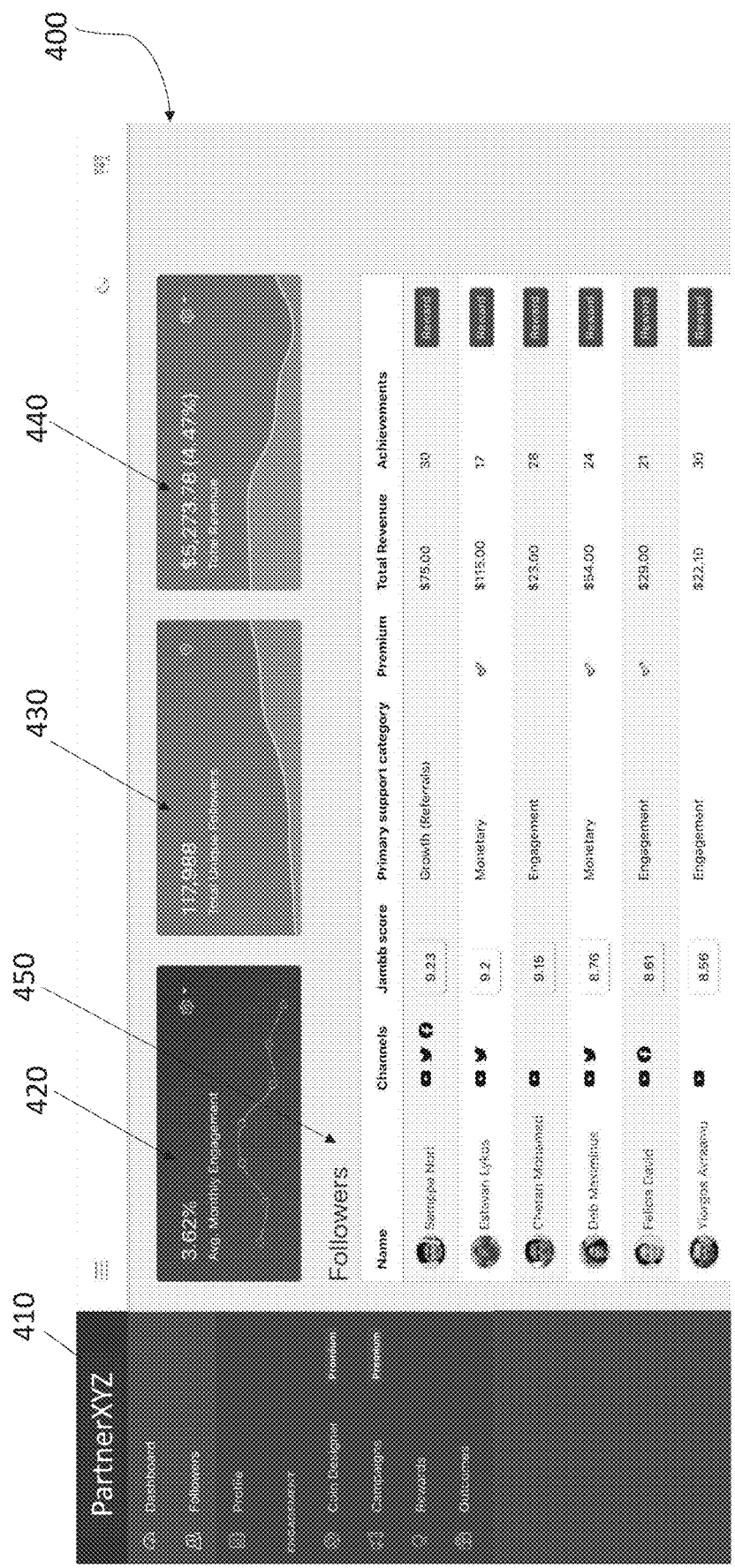
FIG. 2 shows a partner dashboard of a unified engagement platform in accordance with aspects and embodiments.

FIG. 2 shows an embodiments of partner dashboard 400. Partner dashboard 400 provides partners with tools to engage with their supporters via the unified engagement platform. Dashboard 400 has navigation panel 410 which enables partners to view different aspects of their account, access campaign and digital collectible template, account metrics, and other features provided by the platform to a partner. In accordance with embodiments, dashboard 400 displays to the partner metrics 410, 420, and 430, including average monthly engagement 410, number of supporters 420 (labeled as unique followers within the dashboard), and total revenue 430 the partner account has generated and how revenue 430 compares to prior revenue associated with the partner account.

Dashboard 400 may further include panel 450 that displays a partner's supporters (labeled as followers on the dashboard). Panel 450 may provide unique information about each supporter, including what campaigns they have participated in, the engagement attributable to them, and revenue raised by them, and any other features that may assist a partner in planning future platform activity.

For example, in one embodiment the unified engagement platform may utilize an automated pre-qualification process that may require programming instructions executed by a processor to operate. When executed by a processor, the automated pre-qualification process may be referred to as a predictability engine that evaluates key metrics for supporters, either as a group or individually. This engine or process may be activated or deactivated by partners in order to identify top supporters or fans for partners to engage with. In such an embodiment, the engine may cause the unified engagement platform to automatically provide a list of top supporters based on predetermined metrics related to supporter engagement (e.g., comments, views, likes, etc.) or revenue generated.

In some embodiments, the platform disclosed may offer different accounts and/or templates for the creation campaigns and digital collectables for each class of partner. These accounts may differ in membership price point and available features and/or may offer different guidance on what digital collectibles should be offered and how they should be distributed. While digital collectibles are described further herein, as an example, a creator account may have a series of digital collectible templates wherein the creator, a social media influencer, creates personalized video shoutouts available for purchase or as offers the shoutouts as a reward for supporters that engage in certain activity. Brands and retailers generally do not have an individual public face/entity to make such content and thus a brand account would not offer digital collectible templates of that nature. Instead, a brand account may offer a series of digital collectible templates linked to coupons redeemable for discounts for physical goods.

In accordance with aspects and embodiments, the supporter user interface may allow supporters to link their existing social media accounts with their supporter account on the unified engagement platform. In some embodiments, the supporter interface, in contrast to the partner dashboard, may not provide supporters with the option of creating digital collectibles. and digital collectibles are not provided to a supporter by virtue of account creation. In other embodiments, the support interface may provide supporters with the option of creating digital collectibles, thereby allowing supporters to grow their personal brand and/or make money by designing unique digital collectibles to be sold on the platform. In this way, supporters may use the platform to grow into partners.

In accordance with embodiments, a global marketplace is integrated into the platform where all available digital collectables are viewable and searchable. The global marketplace may be accessible via the supporter user interface and the partner dashboard. In some embodiments, the marketplace may show all collectibles, including those owned by supporters. The application may offer marketplace features for supporters to list certain collectibles for sale and/or to make offers on collectibles held by other supporters. The marketplace may offer partners and/or supporters an option to pay to list their collectibles in prime placements in the marketplace feed to gamer more interest in them. The marketplace may additionally use a supporter's social network and activity within the platform to customize the marketplace feed to drive interest and new sales.

Digital Collectibles, their Creation and their Distribution

The disclosed unified engagement program makes novel use of digital collectibles. Digital collectibles, broadly, are defined as any digital item represented both in the platform and as an asset on the blockchain. From a technical vantage point, digital collectibles, as used in the platform, can be thought of as having two halves that comprise the whole. The first half is the portion of the collectible that users see within the platform and associate with having value. It is the front-facing portion of the collectible, the item that a supporter would like to possess. Digital collectibles may have value, but generally are not currency or cryptocurrency. Like a physical collectible, a digital collectible can however span a wide variety of things. Digital collectibles themselves only exist within digital environments, but they can represent real world items on a one-to-one basis, for example, a physical Ken Griffey Jr. baseball card can be represented as a digital Ken Griffey Jr. baseball card. Alternatively, digital collectibles can represent a tangible item as a reference point. For example, a digital pair of Nike sneakers can represent a physical pair of Nike sneakers, but the digital representation is not tied to any pair of Nike sneakers. Digital collectibles may also be provided with physical goods. For example, the purchase of physical textbook may include a digital version of the textbook, where the digital version of the textbook is a digital collectible. Lastly, digital collectibles can be completely fictional items and/or items having no real-world counterparts, for example, an invisibility cloak or magic carpet. Each of these examples highlights the front-facing digital collectible a given user may want to acquire. The disclosed unified engagement platform allows partners to create and distribute their own digital collectibles through the platform to engage their supporters and incentivize their loyalty, as well as provide partners with a new revenue stream.

When a digital collectible is created within the platform, it is automatically added to the blockchain as a non-native digitized asset. That is, digital collectibles are created external to the blockchain and are assets different from the blockchain's native assets, which are its cryptocurrency. For example, in the Algorand blockchain discussed further herein, digital collectibles created within the platform are added to the blockchain as Algorand Standard Assets (ASAs). That is, digital collectibles are represented on the Algorand MainNet as ASAs. The platform may use any blockchain for operation, however, as it is well understood in the art that blockchains have the ability to store, record, and transfer non-native digitized traditional assets. This aspect of the collectible can be thought of as the second half of the whole, the back-end of the collectible. Whenever a digital collectible is created, updated, or sent between users of the platform, a blockchain transaction takes place. The transaction is verified and posted to the blockchain. This aspect of digital collectibles is important because the information posted to the blockchain, that is, digital collectible digitized non-native assets, live on in perpetuity and their characteristics cannot be altered after creation. It also allows the entirety of the platform to operate using the blockchain without users having to engage with the blockchain directly. The creation and distribution of digital collectibles automatically makes use of the blockchain on the user's behalf.

Digital collectibles are most preferably limited-edition items, and the templates used for the creation of digital collectibles may therefore only allow a certain number of digital collectibles within a collection to be created. For example, the template used to create digital collectibles may automatically number each collectible as X of Y, where X indicates which number the collectible is within a collection of digital collectibles and Y represents the total number of collectibles within the collection. By limiting the total number of a given collectible available and displaying the total number on the market, the collectible can increase in value relative to its scarcity. Creators and/or the platform may further assign rarity classes to collectibles to signal to supporters the relative rarity of a given collectible. For example, an entire collection may be assigned a rarity class. Alternatively, the first 10 collectibles within a collection may have a first, most rare rarity class, and the subsequently numbered collectibles in the collection may have second, lesser rarity classes. Limiting the number of collectibles on the market controls the supply of collectibles, thereby increasing the demand and driving upwards the value of collectibles.

The characteristics of each collectible (scarcity, quality, quantity, etc.) and rarity class of collectibles will be displayed to users in the platform as part of the front-end half and, upon creation of a given collectible, the characteristics of it will live in perpetuity in the blockchain as an ASA, the second, back-half of the collectible. The information contained in the blockchain is considered secure and tamper-proof and including this information as part of the creation of collectible creates a permanent record of the collectible's characteristics. This ensures that the digital collectible's value, i.e., its scarcity or rarity, is provably fair and cannot be manipulated after its creation.

Digital collectibles may be distributed by partners in three different ways. A supporter may buy, earn, or win a given digital collectible from a partner. However, regardless of how a digital collectible is distributed, each distribution of a digital collectible is necessarily a blockchain transaction. In some embodiments, the way in which the supporter can acquire the collectible is determined by the partner offering the digital collectible. In additional embodiments, the platform may automatically provision certain digital collectibles to partner accounts and distribute them in predetermined ways on behalf of the partner.

Each of the three distribution methods provides a partner with different ways of engaging with its supporters. By using a combination of distribution methods, partners can keep their profiles fresh, appeal to supporters from various backgrounds and economic conditions, and continue to grow their fan base on the platform and beyond.

Offering collectibles for sale is the most direct avenue for partners to generate revenue. The platform may offer collectibles for sale in dollars, cryptocurrency, in platform-specific points, discussed further herein, or in platform-specific credits that can be purchased or acquired within the application. Credits are platform-specific currency that can be purchased by users with fiat currency. The platform may additionally offer users ways to earn credits by rewarding users with credits when they engage in activities specific to, or related to, the platform. Credits purchased or earned in the platform can then be exchanged for digital collectibles. For example, a partner, in this instance, a creator musician seeking to raise money to buy new recording equipment, may offer to his supporters a golden microphone collectible. Supporters interested in financing the partner's project can purchase a golden microphone collectible from the creator. The supporter's purchase causes a transaction to be posted to the blockchain, which is verified. Upon verification, the supporter will receive the golden microphone digital collectible and the partner will receive the funds exchanged for the digital collectible. The supporter can then display the golden microphone on their personal profile to show to their friends their support of the creator. Their purchase may be advertised in a public feed, their personal feed, and in the partner's community feed. Purchase of the golden microphone digital collectible may additionally be tied to a physical good, for example, a poster signed by the creator, to further incentivize purchases.

Some supporters may not, however, have the financial means to purchase digital collectibles within the application. Providing a mechanism for supporters to earn collectibles is therefore an important feature of the application and benefits partners, as well. Moreover, giving supporters ways to earn digital collectibles fosters brand loyalty by offering supporters ways to obtain the partner's goods without having to purchase them. This incentivizes engagement and encourages supporters to continue returning to the platform.

An important aspect of the platform, in addition to maintaining supporter interest, is rewarding supporters for reach. Supporters are therefore encouraged to engage in activities that benefit the partner, for example, promoting the partner's goods and services, in exchange for rewards. The platform therefore measures the overall influence a supporter's actions, both specifically to a given partner and through the entirety of the platform. When a supporter meets a reward condition associated with a digital collectible, for example, sharing 10 of a partner's posts, the supporter earns the digital collectible and it is transferred to them. Reward conditions for a particular digital collectible are set upon creation of the digital collectible.

Figure 3:
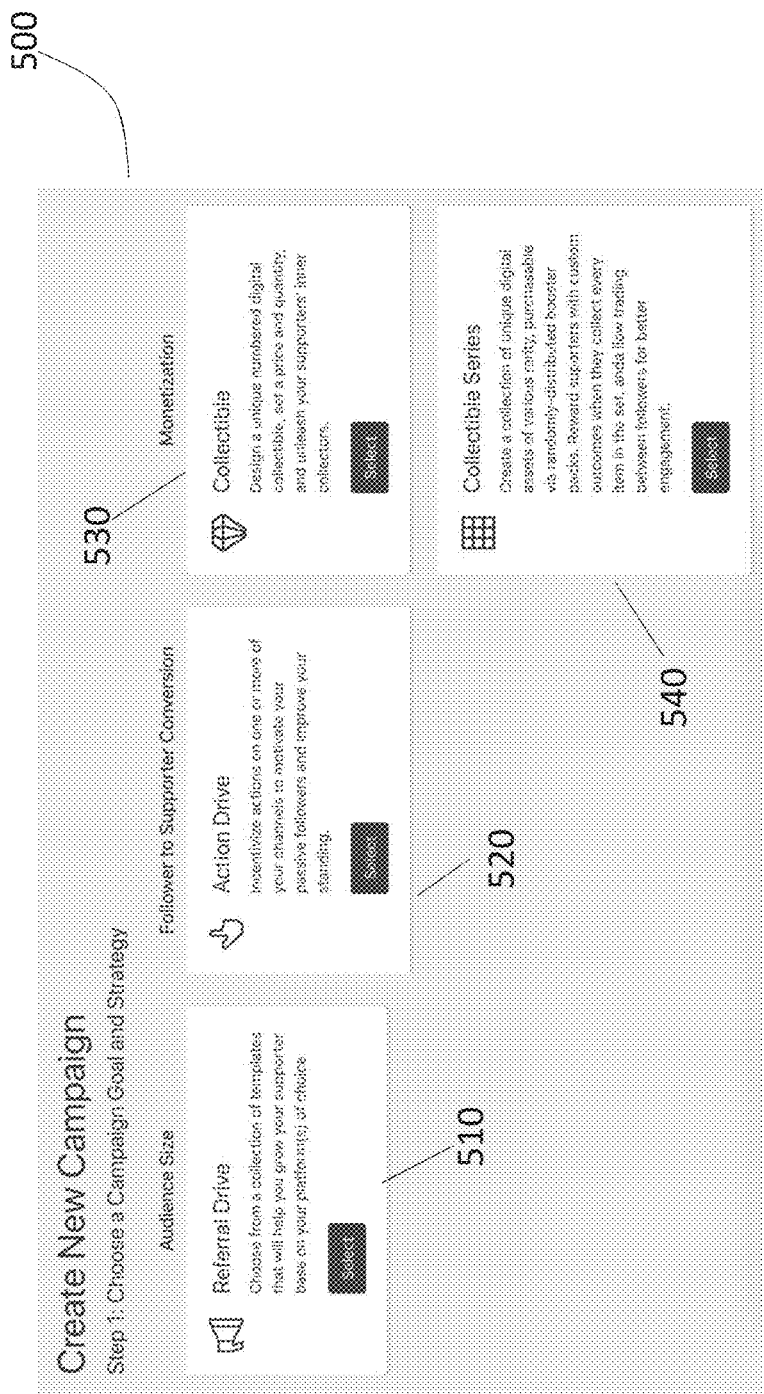
FIG. 3 shows a campaign creation interface of a partner dashboard in accordance with aspects and embodiments.

In some embodiments, the platform may guide partners in the creation of digital collectibles and in carrying out other platform-based actions to meet the goals of the partner. For example, FIG. 3 shows an embodiment of a partner dashboard having campaign-creation interface 500. Campaign creation interface 500 provides partners with several options on actions they can carry out within the platform to achieve certain goals. Campaign interface 500 allows a partner to select any or all of the campaign options 510-540 provided on the campaign creation interface. Referral drive 510 and action drive 520 may enable a partner to create a campaign using digital collectibles already provisioned to the partner's account. Alternatively, selection of referral drive 510 or action drive 520 may cause the platform to create new digital collectibles on behalf of the partner for use in the selected campaign. Alternatively, a partner may select campaign 530 or 540, both of which may require a partner to create custom digital collectibles for use in the selected campaign. Campaigns are not limited to those shown, and other campaign designs will be readily ascertained by those of skill in the art.

In some embodiments and as discussed, partners may automatically be provisioned with a series of digital collectibles that are automatically distributed to the partner's supporters that achieve a certain level of reach, as monitored by the platform, and/or engage in certain activities that benefit the partner. These digital collectibles are designed to have value proportional to the task supporters perform to achieve them, with the value of the collectible being enough to provide supporters with motivation to complete tasks. The value of collectibles distributed for reach lie not in their monetary value, but instead in their scarcity. Alternatively, the collectible may be deemed valuable by the supporter because it has attached to it a coupon for a discount on real-world goods. Alternatively, users may value digital collectibles from a partner for the purpose of demonstrating to their friends their dedication to the partner, this is a form of signaling, a common human behavior attributed to a majority of individual actions.

In some embodiments, the platform may offer supporters unique ways to combine digital collectibles to enhance their overall value. For example, a single digital collectible may not hold very much value but holding three of a certain type of digital collectible may be redeemable for a real-world good. For example, and in some embodiments, the platform may offer a digital "layaway" program. Partners may, for example, offer promotions where if a supporter collects all pieces of an image, where the pieces of an image are digital collectibles, they are able to redeem the full image, i.e., the series of digital collectibles, for a physical product. Each digital collectible that comprises a piece of the complete image may be earned or bought. This enables a supporter to work towards obtaining the full series of collectibles and therefore the acquiring the physical product. To earn digital collectibles that comprise pieces of the image, supporters may have to complete specific tasks that benefit the partner. The supporter may, for example, have to share a pre-determined amount of the partner's content to earn a collectible or the digital collectible may be earned if the supporter successfully gets their friends to engage with the partner in pre-determined, specific ways. The application advantageously monitors these activities on behalf of the partner and automates the distribution of collectibles based on supporters completing certain tasks. Partners may further elect to require that at least one digital collectible in a layaway-type promotion be earned. This ensures that the partner benefits from the promotion in more than a financial way.

Digital collectibles may be distributed in fixed or random ways. For any avenue of distribution, a partner may be able to elect if the receiver of the collectible is to receive a specific digital collectible, i.e., a fixed digital collectible, or if the receiver will receive a digital collectible from chosen at random from several available digital collectibles, i.e., a random digital collectible. In the case of fixed distribution, the supporter aiming to receive the collectible will know the value of the collectible before receiving it and thus before engaging in the tasks required to become eligible for the collectible. In the case of random distribution, a supporter may not know the value of the collectible being distributed in connection with a certain activity. The collectibles being distributed may have a variety of values and supporters may, by chance, receive a high-value collectible that far exceeds the relative "cost" the supporter attributes to earning it. Alternatively, random distribution can involve the distribution of a variety of different collectibles, all of which having the same value.

The platform may further offer novel ways in which partners can craft promotional contests and activities, referred to generally as campaigns. These activities, as discussed, are broadly referred to as campaigns. The platform's unique use of the blockchain and digital collectibles provides ways for supporters to engage with their favorite partners. Campaigns may promote partners in ways not otherwise obtainable absent the offering of some digital collectible. The value of the marketing generated on behalf of the partner by the supporters participating in a contest may far exceed the value of the collectible or collectibles offered as a prize.

In some embodiments, the value of the digital collectibles may increase with the success of a partner's marketing campaign through the use of proof-of-promotion ("POP") digital collectibles. POP digital collectibles may enable the unified engagement platform to inbuild on-chain measurable virality for partners' marketing or promotional efforts that allow supporters to directly benefit. For example, POP collectibles may allow supporters to directly profit from their brand loyalty by crediting the supporters for every successfully redeemed promotion in a marketing campaign. These credits for successful marketing or promotional efforts undertaken by partners may subsequently increase the value of the supporters' POP collectibles over time. The increase in value of the digital collectibles may not be monetary. For example, a digital collectible may increase in value by providing the user access to certain benefits. Alternatively, or simultaneously, in embodiments where the digital collectible is an image, the increase in value of the digital collectible may be reflected by a swapping of layers or a change in imagery.

The platform may offer templates for partners to configure campaigns, i.e., contests and sweepstakes, from their partner dashboard via campaign creation interface 500, as shown in FIG. 3. For example, a partner may select template 510 from the available campaign templates that allows the partner to hold a contest challenging its current supporters to see which of them can get the most new users to both join the platform and support the partner. The partner may tie its own unique digital reward to campaign 510, or may use a reward, i.e., a digital collectible or series of digital collectibles created by the platform on behalf of the partner as a reward.

Figure 4:
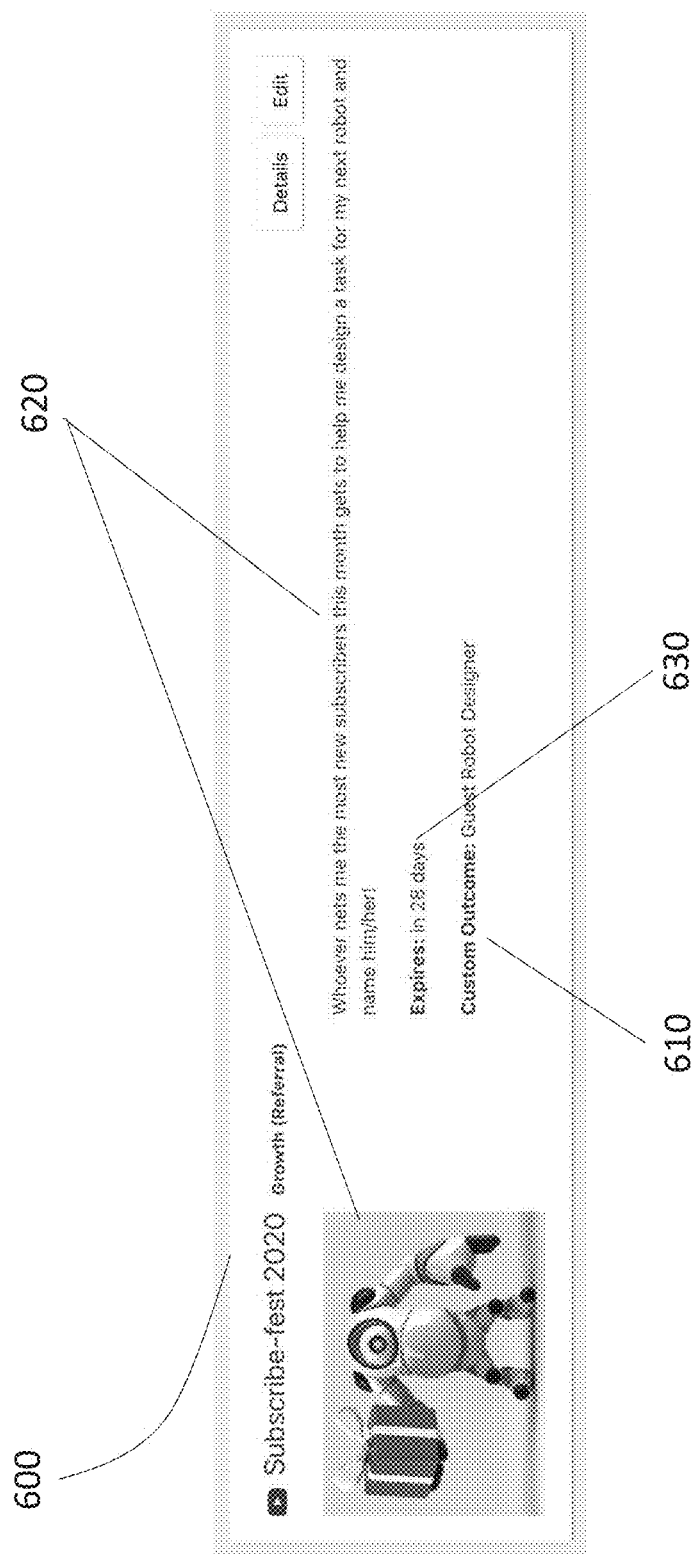
FIG. 4 shows campaign in accordance with aspects and embodiments.

For example and referring to FIGS. 3-4, a partner may select a campaign 510 to encourage supporters to bring their friends to the platform and to become supporters of a partner, which generates campaign 600. Campaign 600 is displayed on the partner's profile. Campaign 600 may have, as shown in FIG. 4, a customized reward 610. In campaign 600 shown, the custom reward allows the winner of the campaign to engage with the partner. The reward associated with campaign 600 is reward 620. Reward 620 is displayed on the campaign and in the present example, the reward 620 allows the winner of the campaign 600 to help the partner running campaign 600 pick new tasks for a robot to perform, where the robot is unique to the partner and its platform, and/or allows the winner to help name the robot. The campaign may further include a time period 630. The pertinent information of campaign 600 is displayed to the partner's supporters to encourage the supporters to engage in the action of bringing new supporters to the platform in exchange for reward 620.

Figure 5:
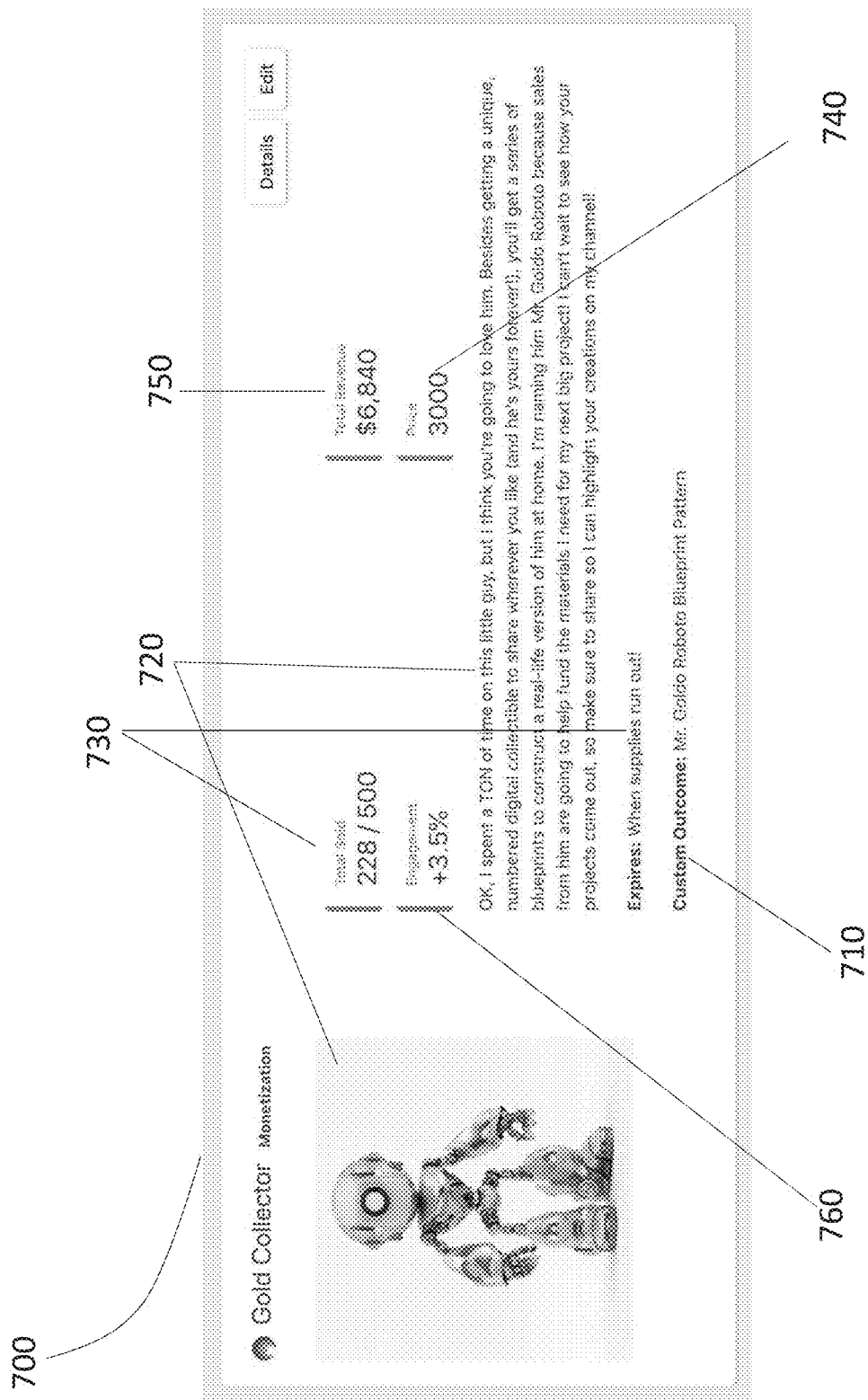
FIG. 5 shows campaign in accordance with aspects and embodiments.

A partner may also offer campaigns for the purpose of generating fiat currency for a project. For example and referring to FIGS. 3 and 5, a partner may select a monetization campaign 530 or 540. As shown in FIG. 5, selecting campaign 530 to monetize a single digital collectible generates campaign 700 with digital collectible 720. Campaign 700 displays the custom outcome 710 of campaign 700 along with other information to encourage supporters to participate in campaign 700. FIG. 5 shows the view of the campaign from the partner dashboard, but several of the features shown to the partner may also be displayed to supporters for the purpose of garnering engagement, and the campaign shown to supporters may resemble FIG. 5, absent certain partner specific features like metrics and the ability to edit the campaign. For example, campaign 700 allows users to purchase digital collectible 720, a golden robot. Digital collectible 720 further includes a real-world item, blueprints to a physical version of golden robot 720. As shown in FIG. 5, partners are provided with ample space to provide both custom images and to speak to their supporters and describe campaign 700's purpose and to advertise collectible 720 tied to campaign 700.

Supporters are informed of the number of digital collectibles 720 being offered 730 to indicate to supporters how rare and/or valuable collectible 720 might be. Campaign 700 lists a price 740 for digital collectible 720. The price 740 may be in platform-specific currency to abstract the concept of fiat currency from the campaign. Alternatively, price 740 may be in fiat currency, for example, U.S. dollars, or may price 740 may be in blockchain currency. Information 710-740 is displayed to supporters, as well as the partner. The total amount of fiat currency 750 raised via the campaign may be displayed to the partner and/or supporters. The partner is additionally provided with metrics 760 related to the campaign. For example, the partner may be provided with metric 760 that informs the partner of how much campaign 700 has increased engagement amongst the partner's supporters.

In accordance with aspects and embodiments, a partner may run several campaigns at a single time. For example, a partner may run campaign 600 and campaign 700 simultaneously.

The platform may offer additional campaign templates that act as contests, like challenging supporters to see who can consume the most of a partner's digital content, and templates that challenge the partner's supporters to come up with ideas for new videos or promotional campaigns. Additional campaigns in the form of contests and sweepstakes and templates associated with these additional contests and sweepstakes will be readily ascertained by those of skill in the art. The platform may advantageously run the campaign contest on behalf of the partner after the partner uses the platform's campaign template to generate and publish a contest campaign. The platform may monitor supporter participation in the campaign with the use of sophisticated analytics built into the platform. The platform, via the use of its analytics and the programming instructions provided by the template used for campaign creation, may automatically determine a winner or winners and distribute the campaign contest prize accordingly. Alternatively, the template or features used within the template may require the partner to manually select a winner.

The platform may further enable partners to use campaign templates to challenge one another to brand wars, thereby enticing their supporters to publicly display their loyalty. Supporters may do so by engaging in certain activities, as outlined by the brand war contest. Supporters may, for example, be asked to participate in the brand war by displaying the brand-specific digital collectibles they already own on their personal profiles. Alternatively, supporters may be offered a digital collectible as part of participating and ask that supporters show their loyalty to their preferred brand by displaying the digital collectible on their personal profile. In still other iterations, supporters may be asked to demonstrate their loyalty to their preferred brand by sharing the partner's digital content, or by other means readily ascertained by those of skill in the art. Each brand may be awarded points for their supporters' activities and the brand with the most points at the end of the campaign wins. Partners can further incentivize activity in brand wars by offering supporters a digital collectible if their preferred brand wins.

The use of the blockchain facilitates the creation and running of design contest campaigns. Partners may, for example, run campaigns wherein supporters submit their original artwork for a given campaign. Users may vote for their favorite artwork and artwork with the highest votes may get platform credit, a digital collectible, or another reward. Every user that submits art to the campaign through the platform will have their art tagged to their specific platform account as a blockchain asset. This ensures that as the art is viewed or used elsewhere, the artist can be given credit for their work.

In some embodiments, the supporter dashboard will have a section, and in some embodiments, a grid where supporters can display a finite number of collectibles. Supporters will prioritize which of the collectibles they are most proud of and which partners they most identify with. In some embodiments, supporters may accrue platform credit, digital collectibles, or other rewards for displaying collectibles on their dashboard for a given amount of time. This incentivizes supporters to display the collectibles of the partners they most want rewards from.

A collectible display may serve as a mechanism for partners to gauge supporter loyalty and is one of the several ways in which the platform collects analytics for partners. In some embodiments, the platform will collect engagement of each supporter for each brand and provide, as part of a partner's maintenance of an account on the platform, a detailed report on the partner's activity on the platform, including the level of engagement they are achieving amongst supporters. The analytics collected within the platform and provided in reports may include, but are not limited to, the number of supporters the supporter has garnered for the partner, the amount of revenue attributable to the supporter, the quantity of likes, follows, subscriptions, or comments made in third party media platform (i.e. YouTube, Twitch, or Instagram), the competing partners, the supporter supporters, and other metrics partners can use to evaluate the efficacy of their activity on the platform. The manner in which analytics are collected within the platform and reported to partners may be performed by any suitable methods known in the art.

Digital collectibles may be used to reward supporters in other ways. For example, more loyal supporters holding more of a partner's digital collectibles may receive enhanced benefits from the partner. Partners may periodically offer their supporters coupons that vary in value depending on the level of a supporter's support, as gauged by the number of digital collectibles they hold. For example, if a supporter holds two digital collectibles from a pizza company partner, they may receive a 20% off coupon for their next pizza order. A user who holds only a single digital collectible from the pizza company partner may receive only a 10% discount. This incentivizes users to collect more digital collectibles in order to receive better rewards from the partners they support.

In aspects and embodiments, the platform and digital collectibles therein are usable outside of the platform. Traditionally, when a digital item is bought within a digital environment, it is only usable within that environment. These limitations reduce the value of digital items. The digital collectibles disclosed herein however may be used across one or more social media platforms outside of the unified engage platform. For example, a digital collectible purchased, earned, or won within the disclosed unified engagement platform may be accessible and usable in other applications as a sticker, which may be displayed as an image or posted on its own to other social media feeds. The availability of digital collectibles outside of the unified engagement platform environment necessarily increases their value.

In some embodiments, the platform may award digital collectibles to partners, as well. Digital collectibles may be awarded to partners when they achieve certain milestones like gaining the first 1000 followers, running their first promotion, and linking social media accounts. Partners may be rewarded further by the platform for the number of digital collectibles they receive by, for example, being offered platform-specific promotional offers.

Rewarding Users for Reach

The disclosed platform provides a mechanism for using social media features common to many applications, like friends, feeds, and sharing content with the platform's digital collectibles that differentiate it from existing platforms. In some embodiments, the platform may encourage engagement with digital collectibles not by just offering them as rewards, but by incentivizing engagement with them and the platform via a points system.

In some embodiments, the platform may allocate points to supporters for certain activities. A user's points may then be used by the platform to generate ranking systems that incentivize supporters to seek out more points. Points may be awarded by the platform to supporters based upon the value of actions they take or elicit from other supporters on the platform. Points may, for example, be awarded by the platform based on any number of supporter activities, including but not limited to clicking on a sponsored link and spending time on the page associated with the link, viewing an advertiser's videos, and buying goods from advertisers and partners on the platform.

In addition to the platform's system of awarding points, partners on the platform may be given their own points system to reward their biggest supporters. Partner points may be the same points or different points than the points awarded by the platform. Partners may, for example, reward supporters with points when supporters view, like, and share partner content, buy partner goods, take part in partner campaigns, successfully invite friends to support the partner, and for any other activities the partner deems worthy of rewarding.

Points may be used by the platform to generate content within the platform. For example, the platform may use each supporter's points to generate a leaderboard or ranking system that is publicly displayed within the platform. Leaderboards may further encourage supporters to interact with the platform in specific ways in order to increase their rank on leaderboards. In some embodiments, the platform may include several different leaderboards that are generated based on other metrics collected by the platform, by for example, the number of likes a supporter's posts get, the amount of engagement of a supporter achieves, the number of consecutive days a user logs into the platform, the number of consecutive days a user posts to the platform, and other activities measured by the platform that incentivize further use of the platform.

In accordance with aspects and embodiments, the platform may offer users the option to engage in affiliate programs. Affiliate programs are well-established business models that reward parties for recommending products to their followers. When a follower purchases one of the recommended products, the recommending party is paid a small commission in return for their referral. Affiliate programs typically require that individuals seeking to participate in them meet certain criteria. Most affiliate programs, for example, require that the individual or entity registered with the affiliate generate unique content that brings users to the individual's social media. This is a barrier to participation for people not already engaged in online business activities.

In some embodiments, the platform may register for affiliate programs on behalf of users. Each user may be assigned an internal affiliate identification linked to their unique blockchain account. As purchases are made that provide compensation via affiliate programs, supporters that have caused these purchases to be made may be rewarded with real money or other rewards. Alternatively, as affiliate programs generate money for the platform, a percentage of the generated affiliate income may be awarded to certain supporters who, by analytics built into the platform, are deemed to have contributed to affiliate sales. Supporters may passively contribute to affiliate sales by sharing digital collectibles of an affiliate who is also a partner and may be rewarded for that activity.

Provisioning Users with Blockchain

The disclosed platform advantageously integrates the blockchain into the platform, thereby providing an on-ramp to blockchain for non-technical users. In accordance with aspects and embodiments, blockchain interactions are automated on behalf of users on the backend of the system without requiring that users have technical proficiency or understanding of blockchain. The disclosed unified engagement platform therefore provides users with an introduction to receiving, storing, and sharing digital collectibles on the blockchain. Each and every transaction carried out in the disclosed platform is therefore advantageously eternalized on a publicly distributed ledger. The platform disclosed herein thus represents a digital collectible platform for real-world rewards, goods, and services.

In accordance with aspects and embodiments, the process of provisioning users with multiple custodial blockchain accounts will be automated through the platform registration process. Upon registration, for example, with an email address, accounts are automatically generated for the user associated with that given email address on the blockchain network associated with the platform. Blockchain networks require that account holders digitally sign transactions every time the account holder posts an update to the blockchain. For example, a signature is required to authorize the transfer of funds between account holders.

How transactions are digitally signed varies between blockchain networks. Some blockchains recommend that transactions be signed computers not connected to the internet. The transactions are then posted to the blockchain for verification. For example, Algorand requires users to securely input a 25-word mnemonic private key consisting of simple nouns (e.g., bread, apple, book, cup, lady) into a command line interface. For security purposes, the signing process takes place on a computer that is never connected to the internet. Once the transaction is signed, users post the signed transaction to the blockchain by connecting to an Algorand node. Nodes are actively running instances of the blockchain responsible for executing the cryptographic checks that verify transactions and keep the blockchain system in order.

Alternatively, some blockchain networks allow signatures through browser extension programs. For example, the Ethereum blockchain uses a browser extension program called MetaMask that allows users to sign transactions more quickly. Users enter their mnemonic key into MetaMask a single time and MetaMask generates a secondary, shorter, security pin with which transactions can be signed. Entry of the pin retrieves the longer key and executes the signature.

A third method of signing transactions on a blockchain network is to utilize a blockchain wallet that stores the user's mnemonic. Blockchain wallets can be cold, i.e., not connected to the internet, warm, or hot, i.e., connected to the internet and having the key stored therein. Use of a hot wallet, for example, on a cell phone, allows a user to send and receive transactions to and from the blockchain without the arduous process of entering a lengthy security key.

The disclosed platform may make use of browser extensions, or blockchain wallets to sign transactions. Importantly, however, the platform will store each user's private key/mnemonic on their behalf and proxy as them and sign transactions for them through the application. This overcomes the problems non-technical users have with completing and benefiting from blockchain transactions, thereby allowing any platform user to make use of the blockchain without needing an understanding of the technology or steps behind the transaction process.

The unified engagement platform disclosed may be used in connection with any known blockchain, including proof-of-work blockchains, including but not limited to BitCoin and Ethereum, and proof-of-stake blockchains, including but not limited to EOS, Tezos, Polkadot, and Algorand. Utilizing blockchain is not, however, free. Transactions incur fees which pay the people and machines that keep the network safe, secure, and functioning, and blockchain requires accounts maintain a minimum balance to cover these fees. Upon registration, the application will fund each user's account with the minimum account balance required for the blockchain. The application will subsequently monitor each user's account and auto-fill the account with the appropriate amount of blockchain currency to allow for continued blockchain use.

In some embodiments, use of blockchain may be omitted and replaced with an internal, platform-specific, record keeping system that provides users with the same safeguards as blockchain. In these embodiments, the platform may use fiat or platform specific currency, for example, the credits previously discussed, for transactions. The platform's internal record keeping system may include a digital collectible authenticator that verifies the authenticity of a digital collectible prior to allowing distribution (purchase or transfer) of the collectible. The internal record keeping system may further include anti-replication measures to ensure that digital collectibles cannot be replicated and reproduced by unauthorized third parties.

In some embodiments that omit use of a third-party blockchain, the platform's internal record keeping system may function in the same manner as blockchain. The platform may distribute numerous copies of its digital collectible ledger internally and the platform may store the ledgers in one or more data stores. The platform may further distribute the platform's digital collectible ledger to each user account.

For example, each account may include, as part of the platform programming, a copy of the platform's digital collectible ledger. The ledger may not or may not be viewable by users. The platform's internal record keeping system may use each account to distribute and publish a copy of the platform's ledger, which may run in the background of the client application. The platform's internal record keeping system may access the ledger in the same manner the platform would communicate with a blockchain network to post and verify transactions. Use of an internal record keeping system over a blockchain network advantageously obviates the need to provision each account with funded blockchain accounts, thereby reducing operating costs of running the platform. However, the maintenance of minimum balances for blockchain accounts and the cost of transaction fees incurred by their use (referred to as gas) may be small and/or negligible, making the added security offered by a third-party blockchain desirable.

In one embodiment, the unified engagement platform disclosed herein uses the Algorand blockchain. For example, when a user registers for an account on the platform, the application generates an account on the Algorand MainNet associated with the user's email address that makes it possible for the user to send and receive digital collectibles, referred to on the Algorand MainNet as Algorand Standard Assets (ASAs). Creation of this account further allows users to create digital collectibles through the application user interface and sell and trade these as ASAs on the Algorand MainNet. Each user's unique 25 word mnemonic key will be stored by the application on their behalf and when the user desires to enter into a transaction, be it an exchange of funds for an ASA, trading ASAs, or some other transaction, the application will sign the transaction on their behalf with their key and post the transaction to the blockchain for verification. User registration further triggers the application to fund the generated account with the minimum number of Algos, Algorand currency, required for Algorand blockchain use. As a user completes transactions and incurs transaction fees, the application will ensure that the user's account balance does not fall below a threshold value of Algos by replenishing the account with Algos if necessary, ensuring that the user can continue to use the Algorand blockchain.

The application advantageously, however, obscures the use of blockchain to the platform's users. In the above embodiment, for example, digital collectibles may not be priced in Algos and transactions may be carried out entirely within the application, without reference to the Algorand MainNet during the transaction process. This allows users to enjoy the benefit of the security and permanence offered by blockchain without having to worry about the technical intricacies of the transaction process. This further solves the problem of on-boarding users to blockchain that would otherwise be intimidated by its complexity.

Figure 6:
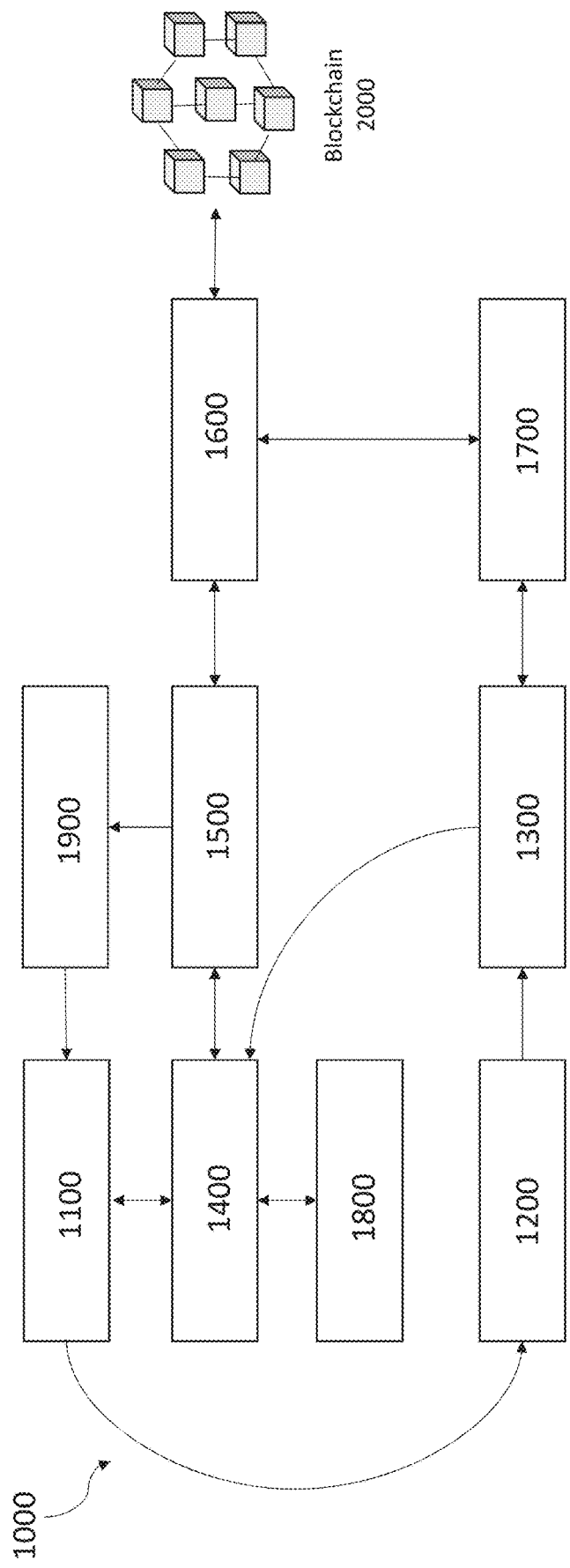
FIG. 6 shows a diagram of the infrastructure of a unified engagement platform in accordance with aspects and embodiments.

FIG. 6 shows an embodiment of the structure of disclosed platform 1000. Supporters and partners access the platform via client application 1000. Client application 1100 includes all supporters and users accessing the platform and may be a web-hosted application, a mobile application, or both. When a partner accesses the client application 1100 and registers for an account, the partner information is sent to identity provider 1200. Identity provider 1200 verifies the partner identity. Identity provider 1200 may be a third-party identity provider or may be built in and native to platform 1000. After partner identity has been confirmed, the partner information is transmitted to platform 1000's blockchain auto-provisioning module 1300. Auto-provisioning module 1300 communicates with the platform's central application module 1400. Application module 1400 communicates with secure message bus 1500 that a new account has been created, and secure messaging bus 1500 engages with the platform's blockchain connector module 1600 to generate blockchain accounts for the new account. In some embodiments, when a new partner account is created, several blockchain accounts are created for the account. These accounts may be used for different features within platform 1000. For example, unique accounts may be created for each creation of digital collectibles, the transfer of non-native digital assets, i.e., platform digital collectibles, and the receipt of and native assets (i.e., blockchain currency).

Turning back to FIG. 6, blockchain connector 1600 communicates with blockchain 2000 to obtain at least one blockchain account for the newly created platform account. Public information, including the public address, related to the newly created blockchain account or accounts is then transmitted back to connector 1600, through secure message bus 1500, and to application 1400. The public addresses of blockchain accounts may further be obscured by platform 1000 by, for example, creating a platform specific identifier that replaces the public blockchain address to mask blockchain account information, all of which is stored by the platform in data store 1800. The private keys associated with newly created blockchain accounts are transmitted from connector 1600 to secure key custody and service module 1700. Module 1900 acts as a notification service and communicates with secure message bus 1500 to provide notifications to the client application. Notification module 1900 thus notifies users on the client application when blockchain accounts have been created and when transactions are completed.

Application 1400 uses data store 1800 to maintain all user information, including their login credentials and the blockchain accounts associated with the user's account. When a user, for example, a partner decides to run a campaign or create a new digital collectible, the user selects the desired action within client application 1100. Client application 1100 transmits the requested action to application 1400. If the action is the creation of a digital collectible, the partner will enter the information about the new digital collectible into client application 1100, which will in turn submit this information to application 1400. Application 1400 will obtain the partner's public blockchain account information from data store 1800 and a packet of information will be submitted to secure message bus 1500 that includes the necessary information to both create the digital collectible within platform 1000 and post the digital collectible as a digital non-native asset on blockchain 2000. Secure message bus communicates with blockchain connector 1600, which accesses secure key custody service and storage module 1700 to acquire the private key associated with the public account creating the asset. Once the private key has been obtained from service 1700, the blockchain connector service posts the transaction to blockchain 2000 and signs the transaction on behalf of the partner. Completion of the transaction is communicated from blockchain 2000 through connector service 1600 and message bus 1500 to notification service 1900, which in turn notifies the partner within the client application that the transaction has been completed. Secure message bus 1600 also communicates with application 1400 to post the newly created digital collectible to the application, enabling any user on a client application 1100 to see it. Information about the collectible and transaction is stored within platform 1000 in data store 1800.

Blockchain connector 1600 may include monitoring and provisioning features that ensure that blockchain accounts associated with application 1400 have blockchain native assets, i.e., cryptocurrency, in an account sufficient to perform blockchain functions. For example, a minimum balance may be required to post non-native assets to the blockchain and thus for each digital collectible created, the account posting the transaction may require a threshold balance of native blockchain assets, i.e., cryptocurrency. When transactions are posted, blockchain 2000 may further require a transaction fee, i.e., gas. Blockchain connector 1600 may monitor blockchain accounts as commands are received from the secure message bus. Blockchain connector 1600 may add native assets to a blockchain account to ensure that the account involved in a desired transaction submitted to the connector 1600 via secure message bus 1500 is capable of carrying out the transaction sought.

While several variations of the present invention have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

Those skilled in the art will readily observe that numerous modifications, applications and alterations of the systems and methods may be made while retaining the teachings of the present disclosure.

What is claimed is:

1. A system comprising:
a computer having memory and a processor;
a platform, the platform requiring programming instructions executable by the processor to operate; and
a computer-readable medium having the programming instructions stored therein,
which when executed by the processor, causes the platform to be operable to:
receive requests from users to join the platform;
register a first user on the platform;
create at least one digital collectible for the first user;
create a partner account for the first user on the platform;
create one or more blockchain accounts on the blockchain, associate with the partner account;
store information associated with the one or more blockchain accounts on the platform;
wherein the information at least includes one or more cryptographic keys associated with one or more blockchain accounts;
distribute the at least one digital collectible to a second user;
wherein the at least one digital collectible is not a currency;
wherein, the platform includes an internal record keeping system for management of the at least one digital collectible.

2. The system of claim 1, wherein distributing the at least one digital collectible to the second user requires a posting of the transaction to the blockchain, and the posting of the transaction to the blockchain comprises the step of storing the transaction in a block on the blockchain.

3. The system of claim 2, wherein the posting of the transaction to the blockchain further comprises the step of giving the block a hash.

4. The system of claim 1, wherein the distribution of the at least one digital collectible is determined by a distribution programming.

5. The system of claim 4, wherein the distribution programming comprises a reward condition that must be met before distribution can take place.

6. The system of claim 1, wherein the at least one digital collectible uses the blockchain for its construction and management.

7. The system of claim 1, wherein identifying information about the at least one digital collectible is stored in the memory of the computer.

8. The system of claim 1, wherein the at least one digital collectible comprises a blockchain asset.

9. The system of claim 1, wherein the at least one digital collectible is redeemable for physical goods or services.

10. The system of claim 1, wherein a partner user can create a new digital collectible for distribution.

11. The system of claim 10, wherein the distribution is selected from the group consisting of a purchase by a supporter with currency, an award to a supporter as a contest prize, or a transfer to a supporter in exchange for the supporter engaging a predetermined set of activities.

12. The system of claim 1, wherein the at least one digital collectible comprises at least one of a utility token or a governance token.

13. The system of claim 1, wherein the at least one digital collectible comprises a proof-of-promotion digital collectible.

14. The system of claim 1 further comprising a predictability engine, wherein the platform is further operable to automatically provide a list of a plurality of top supporters to a partner user based on a programming of the predictability engine.

15. The system of claim 1, wherein the internal record keeping system includes a digital collectible authenticator that verifies an authenticity of the at least one digital collectible prior to the distribution thereof.

16. The system of claim 1, wherein the internal record keeping system includes anti-replication safeguards for the at least one digital collectibles.

17. A system comprising:
a computer having memory and a processor;
a platform, the platform requiring programming instructions executable by the processor to operate; and
a computer-readable medium having the programming instructions stored therein, which when executed by the processor, causes the platform to be operable to
receive requests from users to join the platform;
register users on the platform;
create at least one digital collectible for a first user, wherein a creation of the at least one digital collectible for the first user is facilitated by a platform template;
create a partner account for the first user on the platform;

create one or more blockchain accounts on the blockchain, associate with the partner account;
store information associated with the one or more blockchain accounts on the platform;
 wherein the information at least includes one or more cryptographic keys associated with one or more blockchain accounts;
distribute the at least one digital collectible to a second user;
wherein, the platform includes an internal record keeping system for management of the at least one digital collectible.

18. The system of claim 17 wherein the platform is operable to receive inputs choosing or customizing the platform template to create a customized digital collectible.

* * * * *